United States Patent

Coverdill

[11] Patent Number: 5,957,986
[45] Date of Patent: *Sep. 28, 1999

[54] METHOD AND SYSTEM FOR RECORDING VEHICLE DATA RELATIVE TO VEHICLE STANDARD TIME

[75] Inventor: Cary N. Coverdill, Boring, Oreg.

[73] Assignee: Freightliner Corporation, Portland, Oreg.

[*] Notice: This patent is subject to a terminal disclaimer.

[21] Appl. No.: 09/137,553

[22] Filed: Aug. 20, 1998

Related U.S. Application Data

[63] Continuation of application No. 08/652,776, May 23, 1996, Pat. No. 5,802,545.

[51] Int. Cl.⁶ ......................................... G06F 17/00
[52] U.S. Cl. ........................ 701/35; 701/29; 340/438
[58] Field of Search .................. 701/29, 35; 340/438, 340/439

[56] References Cited

U.S. PATENT DOCUMENTS

| | | | |
|---|---|---|---|
| 4,258,421 | 3/1981 | Juhasz et al. | 701/35 |
| 4,533,962 | 8/1985 | Decker et al. | 360/5 |
| 5,173,856 | 12/1992 | Purnell et al. | 701/35 |
| 5,250,761 | 10/1993 | Koyanagi | 701/35 |
| 5,253,224 | 10/1993 | Van Doesburg | 340/438 |
| 5,303,163 | 4/1994 | Ebaugh et al. | 340/439 |
| 5,452,446 | 9/1995 | Johnson | 701/35 |
| 5,526,269 | 6/1996 | Ishibashi et al. | 340/438 |
| 5,594,646 | 1/1997 | Itoh et al. | 701/35 |
| 5,600,558 | 2/1997 | Mearek et al. | 340/438 |
| 5,650,930 | 7/1997 | Hagenbuch | 701/35 |
| 5,802,545 | 9/1998 | Coverdill | 701/35 |

OTHER PUBLICATIONS

*Owner's Manual Caterpillar Driver Information Display*, Caterpillar, Feb. 1995.
*ProDriver™ User Manual*, Detroit Diesel Corporation, Mar., 1994.
*CELECT RoadRelay™ User's Guide*, Cummins Cadec.

*Primary Examiner*—Gary Chin
*Attorney, Agent, or Firm*—Klarquist Sparkman Campbell Leigh & Whinston LLP

[57] ABSTRACT

A master clock on a truck maintains vehicle standard time for the purposes of monitoring and recording vehicle performance data throughout the vehicle. Vehicle performance data is stored for a predefined period of time in response to detecting predefined events. Instances of vehicle performance data are time stamped with vehicle standard time. The master vehicle clock can also maintain the local time displayed to the driver. In response to inputs from the driver, the difference between driver local time and vehicle standard time is computed and the updated local time is displayed to the driver.

3 Claims, 7 Drawing Sheets

METHOD AND SYSTEM FOR RECORDING VEHICLE DATA RELATIVE TO VEHICLE STANDARD TIME

RELATED APPLICATION DATA

This application is a continuation of U.S. application Ser. No. 08/652,776, now U.S. Pat. No. 5,802,545, entitled METHOD AND SYSTEM FOR RECORDING VEHICLE DATA RELATIVE TO VEHICLE STANDARD TIME, by Cary N. Coverdill, filed May 23, 1996, which is hereby incorporated by reference.

FIELD OF THE INVENTION

The invention relates generally to data management and storage systems for vehicles, and more specifically relates to a vehicle clock capable of maintaining standard vehicle time and a driver local time.

BACKGROUND OF THE INVENTION

In the trucking industry, it is important to accurately maintain time for the benefit of both the driver and for service technicians. Since a truck driver frequently travels across time zones, it is helpful to provide a clock in the cabin that is easy to change with the change in time zones. In view of this fact, it is quite common for trucks to have clocks in the cabin that display time and can be reset to the local time. Aside from the convenience to the driver, it is also useful to have a clock for keeping track of vehicle operating and diagnostic data. For example, if a problem occurs in the transmission, it is useful to know precisely when the problem occurred. Many of the sophisticated electronic controls in trucks do have a mechanism for keeping track of time. Despite the presence of these electronics on board the truck, the frequent changes in local time and/or the lack of a consistency among time keepers in the vehicle often leads to confusion in identifying when problems on the truck actually occurred.

This confusion arises, for example, when a driver tells the service technician that a problem occurred at one time and the problem actually occurred at another time. This can result when an electronic subsystem in a truck records a fault using a time clock that is not consistent with the driver's time or time used by other subsystems in the vehicle.

It is equally confusing when a fault in a subsystem is recorded at one time in a first time zone and then is recorded again at the same time in a second time zone. Consider for example, a truck travelling west from South Bend, Ind. to Chicago, Ill. If faults are recorded in terms of local time, either by the driver or the truck's electronics, it is possible to record a fault at 2:00 P.M. in South Bend and a second fault at 2:00 P.M. in Chicago. The resulting data erroneously shows that the fault occurred twice at the same time, when in reality, they occurred one hour apart.

The problems outlined above occur because of the lack of effective means for displaying and keeping track of time in the truck. The difficulty in diagnosing problems in the vehicle are further frustrated by the lack of effective systems for tracking and recording faults detected in the truck. In general, there is a need for an effective system for tracking and recording events on a consistent basis and most preferably across all subsystems installed in a truck.

SUMMARY OF THE INVENTION

The invention provides a method for accurately recording vehicle performance data relative to a master or vehicle standard time and for conveniently displaying local time in the cabin of the vehicle. The invention further provides a master clock for maintaining vehicle standard time, and a system for recording vehicle data. In this context, vehicle standard time refers to a time reference or time standard in a truck against which the timing of performance data measured throughout the vehicle may be recorded. Vehicle standard time can also serve as a reference point for computing the local time displayed to the driver. Vehicle local time is variable and is typically adjusted by a driver as a time zone is passed. In one embodiment, a master clock maintains vehicle standard time, and also maintains driver local time. One specific way to maintain driver local time is to keep track of the difference between the local time and the vehicle time, and compute the local time, upon request, from the vehicle standard time and the difference value.

In one embodiment, a truck includes a data logging device for recording vehicle performance data relative to vehicle standard time. The data logging device monitors vehicle performance data such as road speed, engine speed, coolant temperature, etc. provided by data measuring devices throughout the vehicle. In the process of recording selected data, the data logging device stamps instances of the data with the vehicle standard time from a master vehicle clock. Time stamping refers to the process of associating vehicle standard time with the data. This master clock in this embodiment also maintains driver local time by keeping track of the difference between local time and vehicle standard time.

A local time display presents the local time in the cabin in the vehicle. If the driver wants to change the local time, he or she simply increments or decrements the time through an input control. Changes in local time are communicated to the master clock. In one specific implementation, the input control and time display are integrated into an instrument control unit. This instrument control unit communicates changes in local time to the master clock, which keeps track of the current difference between vehicle standard time and driver local time.

Further advantages and features of the invention will become apparent with reference to the following detailed description with reference to the accompanying drawings.

BRIEF DESCRIPTION OF THE DRAWINGS

FIG. 4 is a diagram of the keypad of the instrument control unit shown in FIG. 3.

DETAILED DESCRIPTION

Figure 1:
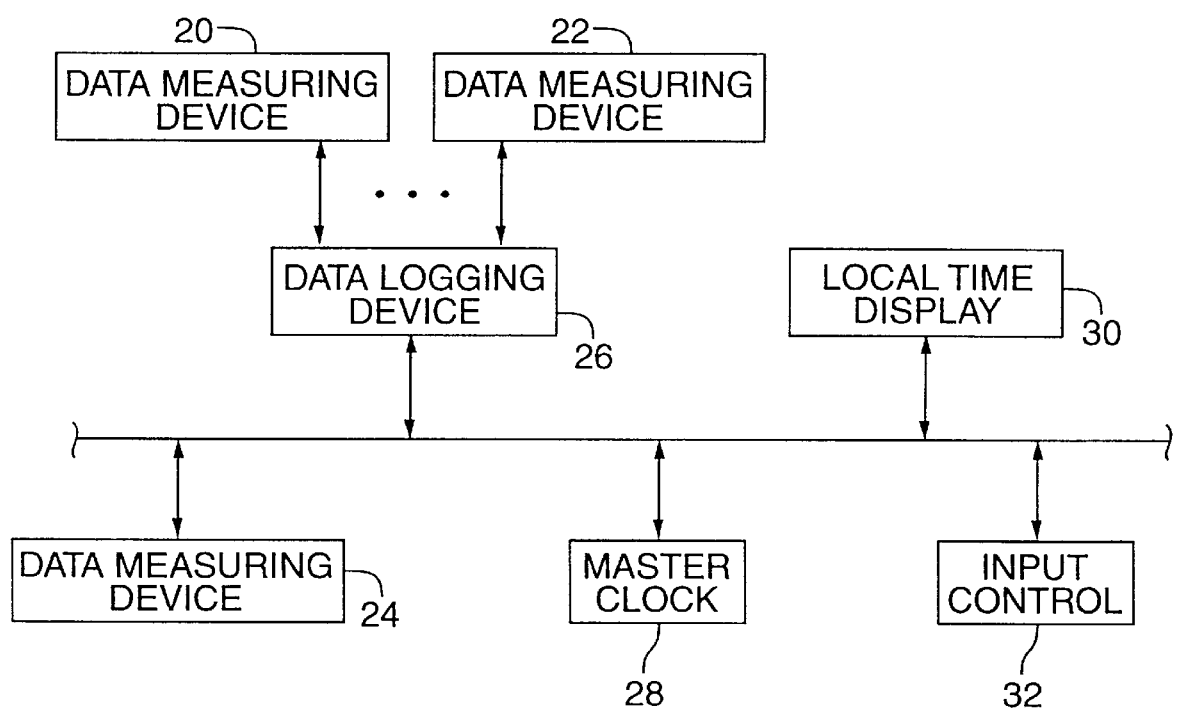
FIG. 1 is a functional block diagram illustrating a vehicle data recording system of an embodiment of the invention.

FIG. 1 is a functional block diagram illustrating a vehicle data recording system of an embodiment of the invention.

The system includes a plurality of data measuring devices (e.g. 20, 22, or 24) for measuring vehicle performance data. Vehicle performance data can include a variety of vehicle operating, trip, maintenance or diagnostic data such as oil pressure, road speed, fuel rate, coolant level, coolant temperature, battery voltage, odometer etc. In addition, such vehicle performance data can include fault data such as oil pressure low, coolant temperature high, high intake manifold air temperature, electrical system or subsystem failure, etc. The vehicle performance data can be measured indirectly via sensors controlled by electronic control units, or directly via discrete sensors or input devices.

The data logging device 26 monitors vehicle performance data and potentially records selected instances or "slices" of this data. As alluded to above, the data logging device can receive the vehicle performance data either directly from a data measuring device such as a discrete sensor or input device, or indirectly through messages from electronic control units on a data link. For example, sensors can include a coolant level sensor, a battery voltage sensor, an input device located in the cab of the truck etc. Similarly, the data logging device 26 can be coupled to one or more electronic control units that measure performance data and transfer it to the data logging device via a data link.

The data logging device 26 can be programmed to record selected vehicle performance data in response to events. An event can be a fault detected in the vehicle such as coolant level low or electrical subsystem failure. In addition, an event can be a manually triggered signal or data message sent to the data logging device. For instance in one specific embodiment described further below, one type of event is a manually triggered event initiated by the driver. When used in conjunction with the time tracking devices in the system, this type of event is useful for tracking precisely when the driver experiences problems.

The master clock 28 is a time keeping device that maintains vehicle standard time on the truck. Vehicle standard time refers to a shared time resource or reference that monotonically increases from a starting time, and acts as a time reference for instances of vehicle data and events. The master clock can be located in a variety of locations in the truck. For instance, it can function as a stand alone device or can be incorporated into the data logging device 26, or other electronic control device in the vehicle such as an engine computer or an instrument control unit in the cabin. In one embodiment, the master clock communicates vehicle standard time to the data logging device so that the data logging device can record the performance data relative to vehicle standard time.

In addition to keeping vehicle standard time, the master clock can also provide driver local time, which may or may not differ from the vehicle standard time. In one specific embodiment, the master clock maintains driver local time by storing the difference between driver local time and vehicle standard time.

The local time display 30 shown in FIG. 1 displays the driver local time in the cab of the truck. It can receive the local time either directly or indirectly from the master clock 28. In one specific embodiment, the local time display receives the local time via the data logging device 26.

The input control 32 enables the driver to control the display of driver local time. Located in the cabin of the truck, the input control enables the driver to increment or decrement the local time. For example, if the truck passes through a time zone, the driver can change the local time easily by simply pressing a button on the input control to change the local time displayed in the cabin. In one specific embodiment, changes in local time are communicated to the master clock, which maintains the current difference or "delta" between vehicle standard time and local time. More detail regarding a specific implementation of the system in FIG. 1 follows below.

Figure 2:
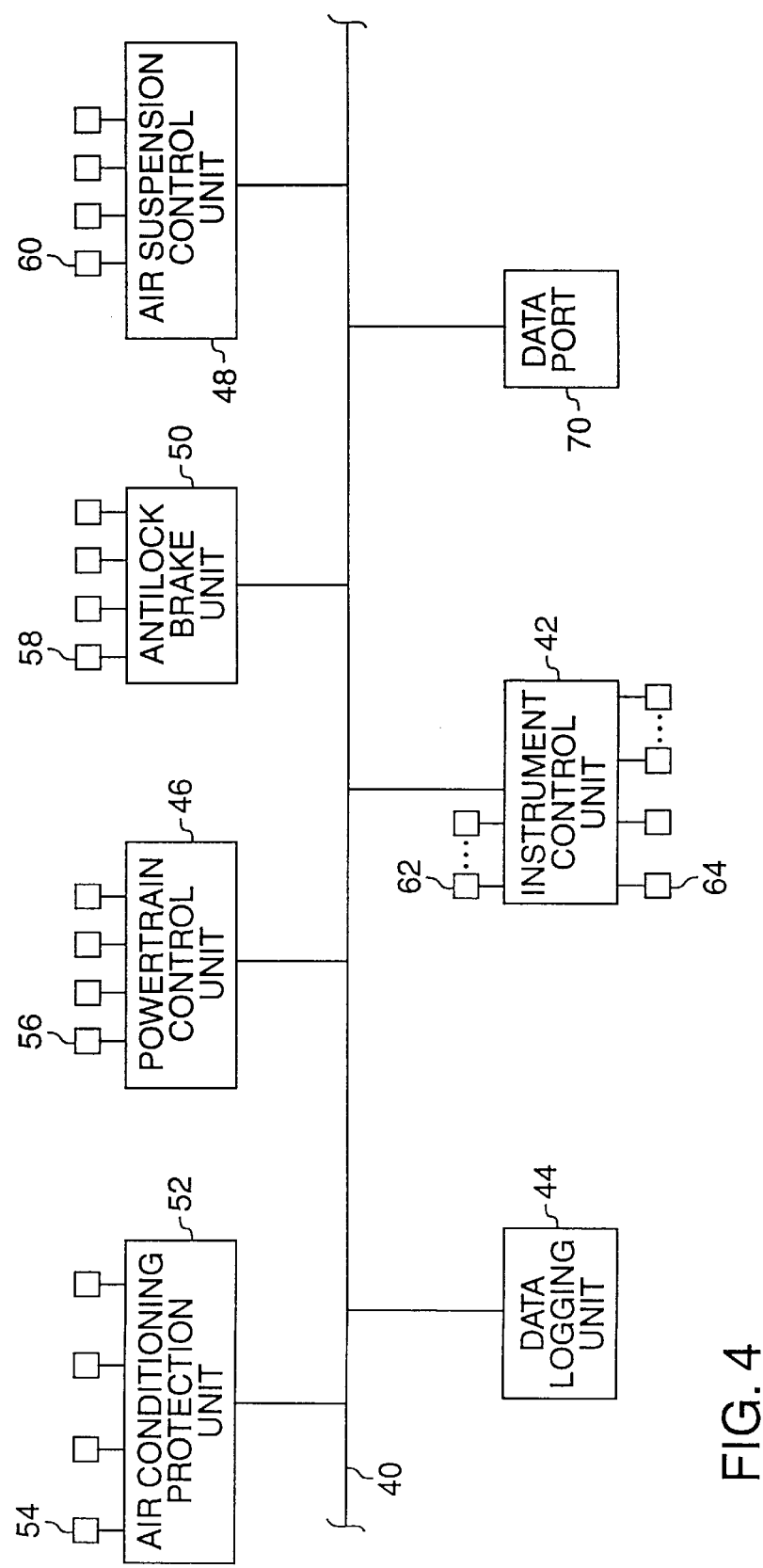
FIG. 2 is a block diagram illustrating the architecture of data management system on a vehicle.

FIG. 2 is a block diagram illustrating the system architecture in a more specific implementation of the system shown in FIG. 1. The system architecture includes a number of electronic control units (ECUs) coupled together in with a data link 40. In particular, the system includes an instrument control unit 42, used to control instruments and gauges at the dash of the truck, and a data logging unit 44, used to monitor and record events reported on the data link 40. The illustrated system architecture also includes a number of other electronic units as shown, such as a powertrain ECU 46, an air suspension ECU 48, an antilock brake ECU 50, and an air conditioning protection unit 52. An ECU typically includes a microprocessor, memory and one or more sensors and actuators (54, 56, 58, 60, 62 and 64 for example) used to control and/or monitor truck performance.

As one possible implementation, the devices depicted in FIG. 1 can be implemented in the system architecture shown in FIG. 2. In one embodiment, for example, the data logging device and master clock are incorporated into the data logging unit 44. The input control and the local time display are features of the instrument control unit 42. Finally, the data measuring devices may correspond to the electronic control units. For instance, a data measuring device can be implemented in an electronic control unit, equipped with sensors for measuring vehicle performance data. As another example, a data measuring device can be implemented as a discrete sensor directly coupled to the data logging unit. More detail regarding the instrument control unit and data logging unit follows below.

The system architecture in FIG. 2 also includes a data port 70 for coupling external devices to the on-board data link. This data port 70 enables an external computer to receive and transmit messages on the data link. It also enables an external computer to establish a connection with an ECU on the network to either download data or retrieve data from memory of an ECU on the data link.

The data link 40, in this implementation, is a serial communication path connecting the ECUs together. This particular data link is designed according to SAE J1708, a standard for serial data communication between microcomputer systems in heavy duty vehicle applications. While this specific embodiment is based on the J1708 standard, it is not critical that the invention be implemented in this specific manner. One possible alternative is to use a data link constructed according to SAE J1939.

In one specific embodiment, the data link 40 is comprised of a twisted pair cable operating at 9600 baud. Designed according to the SAE J1708 standard, the data link forms a communication channel among electronic control units coupled to it. Electronic control units generate a digital signal on the data link by applying a voltage differential between the two wires in the cable. A voltage differential above a specified threshold represents a logic high value, while a voltage threshold below a specified threshold represents a logic low value. This type of data link is particularly advantageous for hostile environments because the signal is more robust and impervious to signal degradation. However, other alternative communication media could be used in place of the J1708 cable.

The ECUs connected on the network communicate with each other according to protocols defined in SAE J1708 and SAE J1587. The SAE J1587 standard is entitled "Joint SAE/TMC Electronic Data Interchange Between Microcomputer Systems and Heavy Duty Vehicle Applications." This standard defines the format of data and messages communicated among microprocessors connected to a shared data link, and is specifically adapted for use with SAE J1708.

According to SAE J1708/J1587, the ECUs on the data link communicate by passing messages to each other. The ECUs can be either receivers, or receivers and transmitters. In this particular implementation, the instrument control unit and the data logging unit are both transmitters and receivers.

A message includes the following: 1) a module ID (MID), 2) one or more parameters, and 3) a checksum. The number of parameters in a message is limited by the total message length defined in the SAE J1708 standard. The message identification numbers are assigned to transmitter categories as identified in SAE J1587. The MID portion of a message specifies the origin or transmitter of the message. In the majority of cases, messages are broadcast on the data link without specifying a receiver. However, the message format can be extended to include the MID of a receiver after the MID of the transmitter for special applications.

The messages passed among the ECUs to convey information by one or more parameters contained within the messages. According to the SAE J1587 standard, the first character of every parameter is a parameter identification character (PID). The parameter identified by the PID directly follows the PID. The SAE J1587 supports different data formats including a single character, a double data character or more than two data characters representing the parameter data. Several parameters can be packed into a message, limited by the maximum message size as noted above.

In this implementation, the ECUs communicate with each other over the data link according to the SAE standard J1708. The standard describes methods for accessing the data link and constructing messages for transfer over it. It also defines a method for resource contention among the ECUs on the data link.

An ECU wishing to transmit data on the data link first waits for a lull in transmission of data on the data link. In this particular implementation, the length of the lull is 200 milliseconds. After detecting this lull, the ECU attempts to transmit its message. The transmitter broadcasts its message onto the data link. Each of the ECUs that operate as receivers on the data link will receive the message. However, receivers only act on a message if programmed to do so.

In some cases two or more transmitters may attempt to broadcast a message at one time, giving rise to a collision. To resolve a conflict among transmitters, messages have a priority according to their message identifiers. The PIDs of higher priority parameters have a greater number of bits set at a logic level one. When more than one message is broadcast at a time, the more dominant message takes priority over lesser dominant messages. Since a lower priority message is blocked by a higher priority message, the transmitter of the lower priority message waits and retransmits the message after another lull. An ECU on the data link will continue to attempt to send a message until it is successfully broadcast to the data link.

While this particular embodiment is implemented according to the SAE J1708 standard, this is only one example a suitable data link implementation. Other alternatives are possible as well. For example, the data link can be implemented according to SAE J1939.

Figure 3:
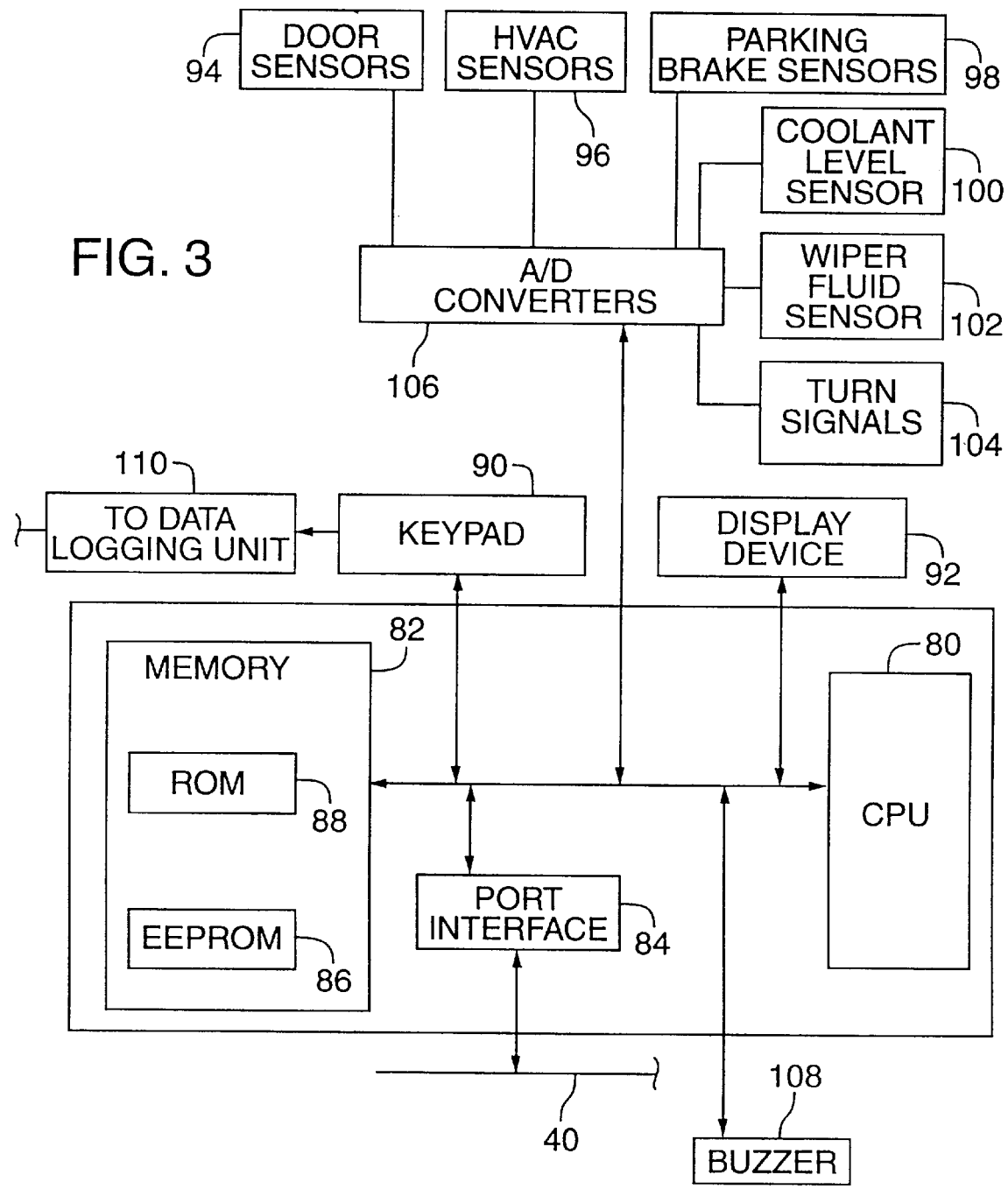
FIG. 3 is a block diagram illustrating an embodiment of an instrument control unit in the data management system.

FIG. 3 is a block diagram illustrating the instrument control unit (ICU) in an embodiment of the invention.

Preferably located at the dash of the truck, the instrument control unit can include the input control that enables a driver to display driver local time and to change the displayed time as well.

The instrument control unit includes a CPU 80, memory 82 and a port interface 84 for connecting the unit to the data link 40. The memory includes programmable ROM (EEPROM) 86 and permanent ROM 88. The routines for controlling the ICU are stored in ROM 88, while configurable data such as a configuration file is stored in the EEPROM 86.

The ICU also includes an input device 90 and a display device 92. In this implementation, the input device 90 is a ten key keypad, and the display device 92 presents a two-line display, sometimes referred to as the "message center." In one implementation, the display device comprises a two by 20 character vacuum fluorescent display. Alternative implementations are also possible such as a Liquid Crystal Display (LCD) or raster display device.

The ICU can be connected to a number of sensors (94–104) through analog to digital converters 106. For example, the ICU in this implementation is coupled to: door sensors (94) for detecting when the cab doors are open or closed; HVAC sensors (96) for determining whether fresh air is circulating in the cab; parking brake controls (98) for sensing whether the parking brakes are applied; a coolant level sensor (100) for detecting when the coolant level drops below a specified level; wiper fluid sensors (102) for determining when the wiper fluid drops below a specified level; and turn signal controls (104) which indicate when a turn signal is applied.

The ICU can also include a buzzer 108 used to notify the driver when certain warning conditions are detected. Typical examples of these warning conditions include "cab door open," "parking brake applied and vehicle in motion," "coolant level low," etc. In this implementation, the buzzer is integrated into the ICU. However, a buzzer or other audio transducer can be implemented as a discrete device to the ICU.

The particular ICU used in this implementation is manufactured by Joseph Pollak of Boston, Mass. for Freightliner Corporation. The instrument control unit is available as a replacement part from Freightliner Corporation.

FIG. 4 is a diagram of one implementation of the keypad. The keypad includes the following dedicated keys:

| | |
|---|---|
| 1. Time | (120) |
| 2. Temperature | (122) |
| 3. Fuel | (124) |
| 4. Trip (miles, hours and fuel) | (126) |
| 5. Leg (miles, hours and fuel) | (128) |

The keypad also includes the following general purpose keys:

| | |
|---|---|
| 1. Left Arrow Key | (130) |
| 2. Down Arrow Key | (132) |
| 3. Right Arrow Key | (134) |
| 4. Set/Reset Key | (136) |

The keypad includes an event key 138 which enables the driver to specify that an event or problem has occurred with the vehicle. For example, if the driver is experiencing problems with the transmission, he can depress the event key to record data associated with the transmission problem. In response, the data logging unit 44 (FIG. 2) receives an interrupt signal from the keypad 90 of the ICU (FIG. 3) and creates an event file. In this implementation, there is a discrete connection 110 from the keypad 90 to the data logging unit 44. In addition, the ICU can send a message to the data logging unit over the data link 40 to notify it that the driver or other user has triggered a manual event at the keypad 90.

Using the keypad, a user such as the driver or other operator is able to display and set driver local time. In this particular embodiment, the ICU displays driver local time in response to an input received from the "time" key in the keypad. Driver local time includes the time in hours and minutes (hh:mm A.M. or P.M.) and the date (month day, year). The time and date can be displayed at any time in response to the "time" key so long as the power to the dash of the truck is on.

To change or set the driver local time in this embodiment, the user presses a sequence of keys on the keypad to retrieve a set-up screen. For safety reasons, the set-up mode of the ICU can only be activated when the parking brake is applied. Further detail regarding setting and changing driver local time is provided below. Any available local time resetting approach may be used.

Figure 5:
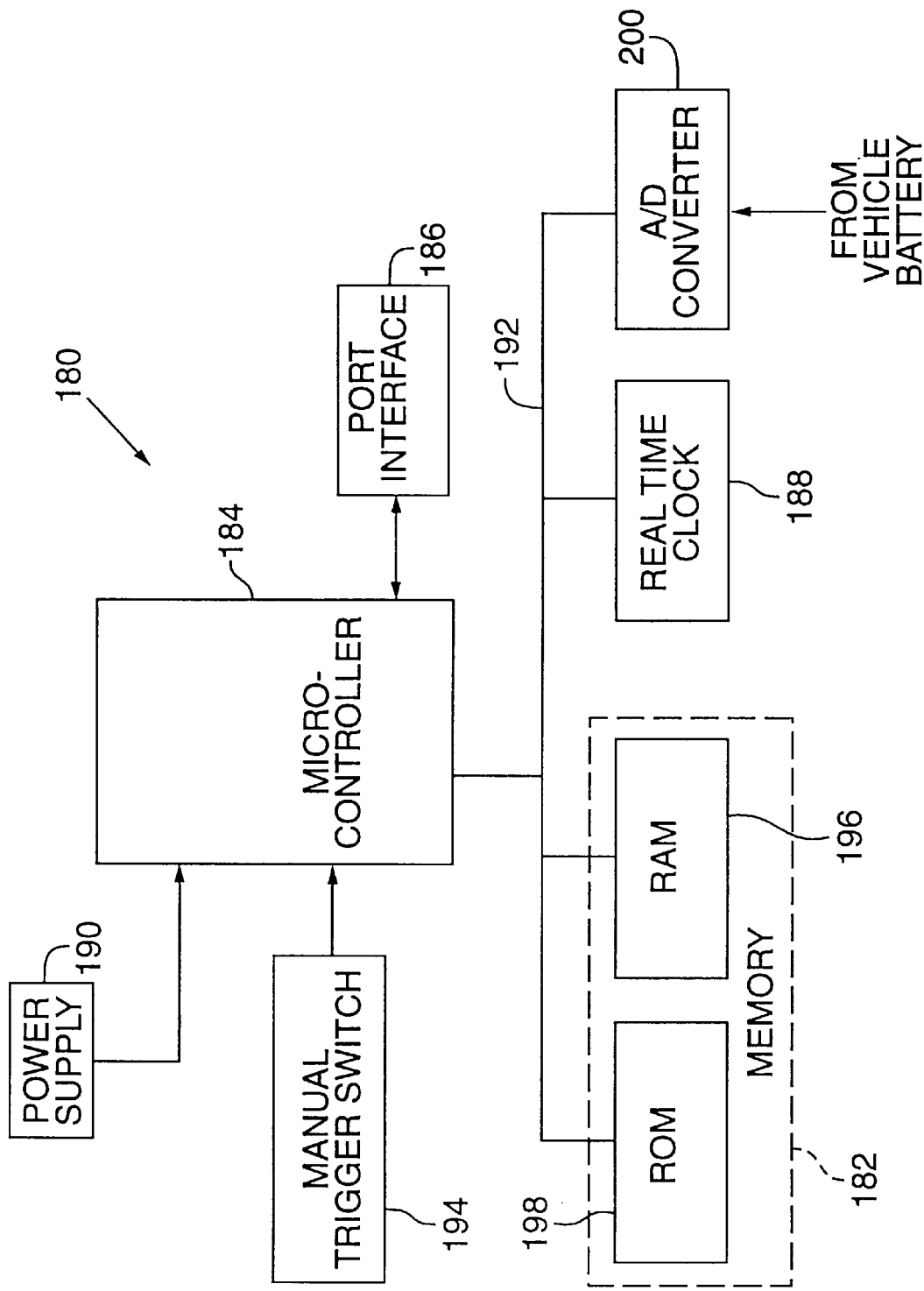
FIG. 5 is block diagram illustrating the data logging unit in one embodiment of the invention.

FIG. 5 is block diagram illustrating the data logging unit in one embodiment of the invention. In this implementation, the data logging unit incorporates the data logging device and master clock shown in FIG. 1. The data logging unit 180 generally includes memory 182, a microcontroller 184, an interface 186 to the data link, a real time clock 188, and a power supply 190. The memory 182 and the real time clock are coupled to the microcontroller 184 via a bus 192.

The power supply 190 includes a chip that supplies power to the microcontroller from either the vehicle battery or a lithium battery or other back up power supply. The lithium battery serves as a back-up in the event that the voltage supplied from the battery is insufficient or unavailable.

As noted above, the data logging unit is coupled to the keypad 90 of the ICU (FIG. 3) to receive an interrupt when a user actuates the event key on the keypad. This connection is represented by the manual trigger switch 194 shown in FIG. 5. The data logging unit can also receive interrupts from other devices as well. The keypad of the ICU could also be coupled to the data logging unit to communicate signals representing changes in driver local time. For example, a key or keys on the keypad could be configured to send signals to the data logging unit to update or modify local time, or the delta between vehicle standard time and local time, stored in the data logging unit.

The memory 182 of the data logging unit includes both RAM 196 and ROM 198. This implementation includes 128 KB of ROM, which stores the application code executed by the microcontroller. This executable code includes the set-up routines used to boot the data logging unit and the data logging routines used to monitor predefined events. This implementation also includes 256 KB of battery-backed RAM, which is used to implement a FIFO buffer for capturing data from the data link, to store event files and to store a device parameter file.

The data logging unit can monitor vehicle performance data from the data link or from discrete sensors coupled directly to it. For example, the data logging unit monitors voltage supplied by the vehicle battery through an analog to digital converter 200, which converts the 12 volt signal from the battery to a digital signal compatible with the microcontroller 184.

The real time clock maintains vehicle standard or reference time. Though the driver local time may be reset, for example as the truck passes through time zones, the vehicle standard time does not change with changes in the local time. Instead, the vehicle standard time monotonically increases from an origin. Vehicle standard time is helpful in recording faults and events because it prevents ambiguity in tracking when these faults or events occurred relative to each other. Further detail regarding the operation of the master clock and the local time display is provided below.

As introduced above, the data logging unit performs a data monitoring function. Coupled to the data link, the data logging unit listens for periodic data messages broadcast over the data link, and continuously records a snapshot of data from the data link into a temporary storage device, such as a FIFO buffer. In this implementation, the data logging unit is programmed to continuously store the most recent 60 seconds of data from the data link. Instances of vehicle performance data can be captured at different intervals. For example, data can be captured once a minute, twice a minute, every second, or only when a predefined event is detected. Some examples of the data monitored by the data logging unit are set forth below. The name of the parameter is followed by the parameter identification number (PID) as set forth in the SAE J1587 standard.

Vehicle Road Speed; PID 84

Percent Throttle; PID 91

Percent Engine Load; PID 92

Output Torque; PID 93

Engine Oil Pressure; PID 100

Turbo Boost Pressure; PID 102

Coolant Temperature; PID 110

Engine Speed (RPM); PID 190

The data logging unit captures instances of selected data once every second and stores it in the buffer. When the buffer is full, the most recent second of data overwrites the oldest snapshot of data.

In addition to continuously storing slices of selected data, the data logging unit also monitors predefined events. These events can be defined by a PID broadcast on the data link, or by a discrete signal (such as an interrupt) received at the data logging unit. When one of the predefined events occurs, the data logging unit stores the last 60 seconds worth of data to memory and begins storing data following the event, such as the next 60 seconds worth of data. In total, the amount of data stored for an event includes two minutes and one second worth of data in this particular implementation. This data is recorded in an event file in memory. An external computer can be used to extract one or more of these event files from the data logging unit for diagnostic purposes.

As noted above, the system architecture on-board the vehicle maintains both vehicle standard time for tracking events and faults and driver local time for display to the driver. In the implementation described and illustrated above, the data logging unit maintains vehicle standard time and the difference (delta) between vehicle standard time and driver local time. In response to a request to display local time at the keypad, the ICU issues a request for the time. The data logging unit then returns the appropriate time to the ICU.

Figure 6:
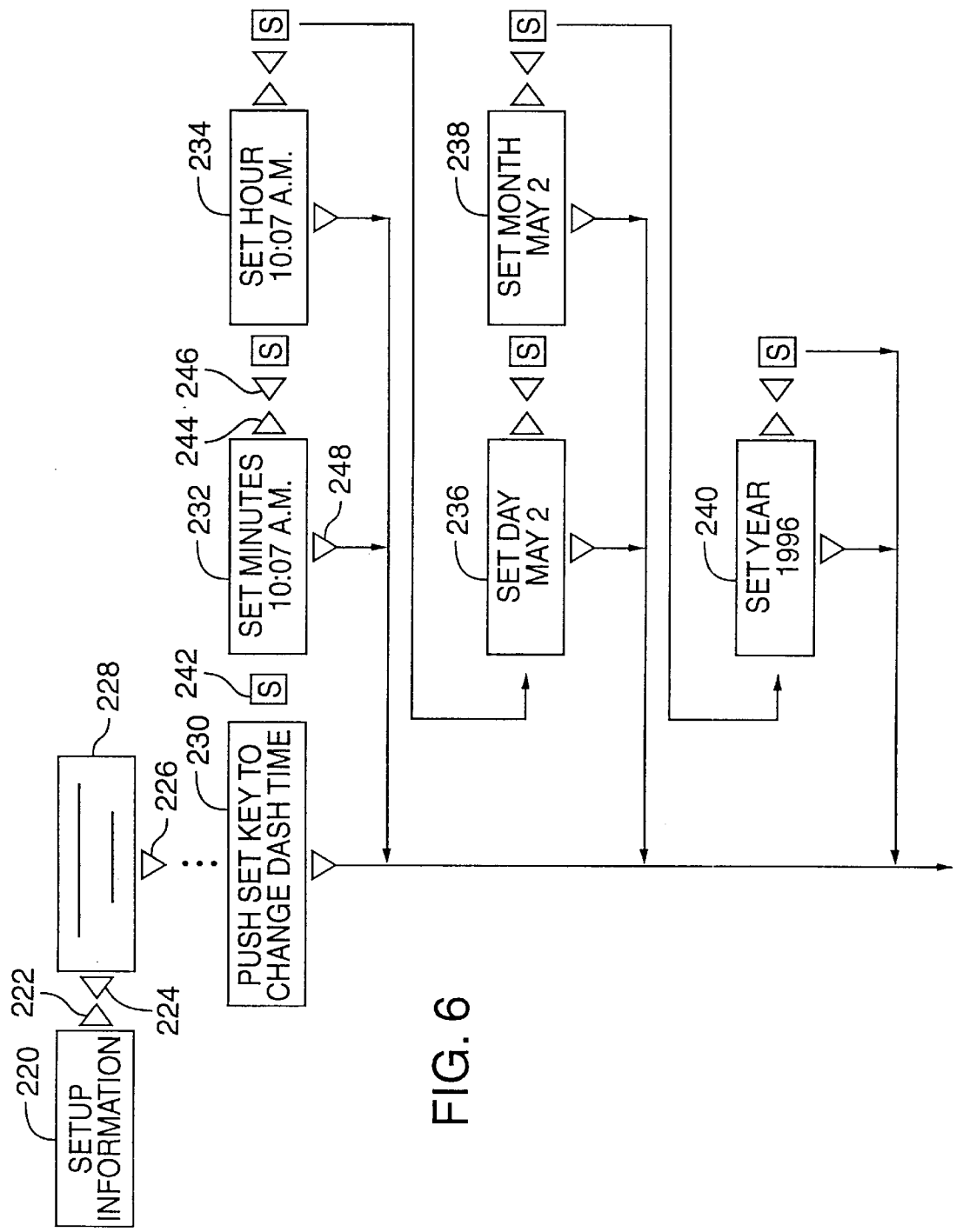
FIG. 6 is a diagram illustrating one example of the display screens used to set or change drive local time.

FIG. 6 is a diagram illustrating one example of the display screens used to set or change driver local time. This diagram shows a series of display screens as well as the keys on the keypad used to change screens and enter data. Starting with the setup screen 220, the user accesses time/date setup screens by using the arrow keys (222–226 for example) on the keypad as shown. The user begins by scrolling through setup screens 228 to reach the main time/date screen 230.

When the user reaches the main time/date screen 230, he or she can then set the minutes (232), hours (234), day (236), month (238) and year (240) using the set key 242 and left and right arrow keys 244, 246, for example. To exit the time/date screens, the user can press the down arrow key (248 for example). FIG. 5 represents only one example of one implementation of a user interface for the ICU. A number of other approaches are possible as well.

Figure 7A:
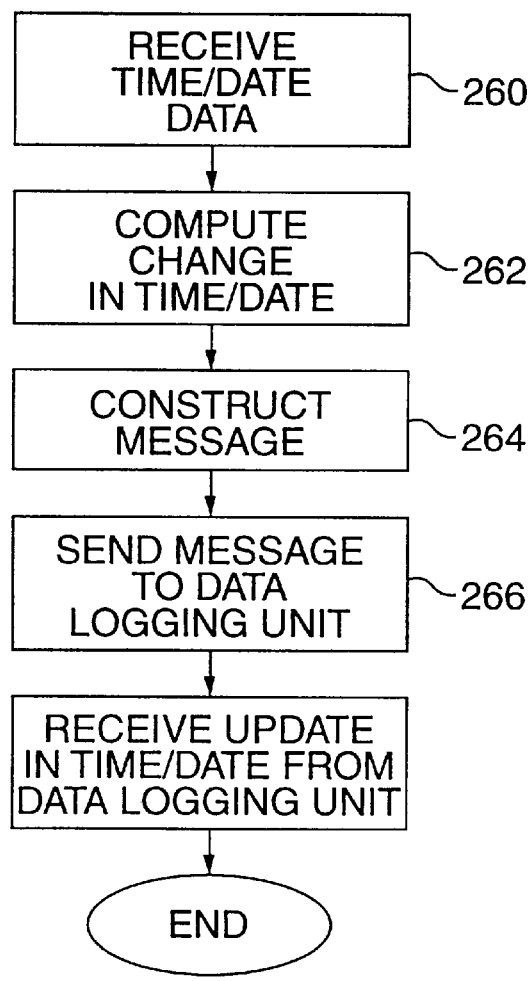
FIGS. 7A and 7B are flow diagrams illustrating a process for setting the driver local time in one embodiment.
Figure 7B:
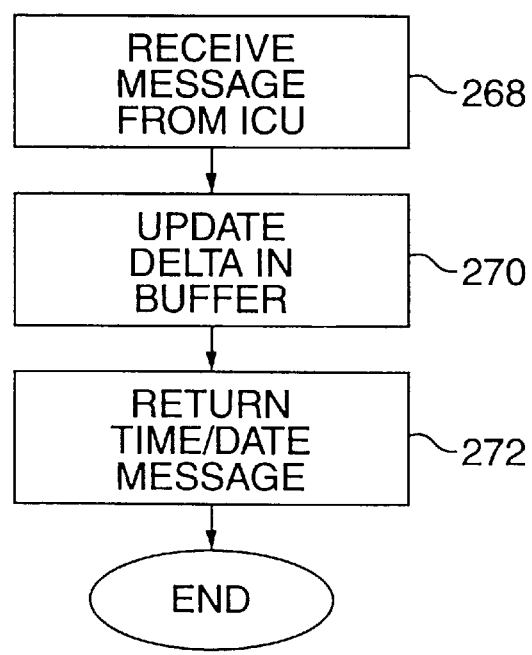

FIGS. 7A and 7B are flow diagrams illustrating a process for setting the driver local time in one embodiment. FIG. 7A illustrates the steps executed by the ICU, and FIG. 7B illustrates the steps executed by the data logging unit.

The process begins when a user changes the time or date from the setup screens as described above. The ICU receives the data entered at the keypad when the user presses the set key (260). It then computes the change in time or date of the driver local time (262). The ICU then constructs a message to send to the data logging unit (264). Depending on what the user changes, a message or messages can be sent for the change in time, the change in date, or changes in both the time and date.

The specification for one implementation of the change in time is set forth below.

| Delta Time Change | | | |
|---|---|---|---|
| Priority: | 8 | | |
| Update Period: | As needed | | |
| Format: | MID_Cluster | 254 | MID_Datalogger |
| | Message_Length | 31 | Minute_Byte |
| | | | Hour_Byte Checksum |

Where Minute_Byte and Hour_Byte are as defined below:

| Byte | Type | Resolution | Valid Range |
|---|---|---|---|
| Minute | Signed Short Integer | 1 minute/bit | −60 to +60 minutes |
| Hour | Signed Short Integer | 1 hour/bit | −24 to +24 hours |

Example:

140 254 179 3 31 01 00
 Checksum

Example requests displayed time be incremented by one minute.

The specification for one implementation of the change in date is set forth below.

| Delta Date Change | | | |
|---|---|---|---|
| Priority: | 8 | | |
| Update Period: | As needed | | |
| Format: | MID_Cluster 254 | MID_Datalogger | |
| | Message_Length 30 | Day_Byte Month_Byte Year_Byte | |
| | | Checksum | |

Where Day_Byte, Month_Byte, and Year_Byte are as defined below:

| Byte | Type | Resolution | Valid Range |
|---|---|---|---|
| Day | Signed Short Integer | 0.25 day/bit | −31.75 to +31.75 days |
| Month | Signed Short Integer | 1 month/bit | −12 to +12 months |
| Year | Signed Short Integer | 1 year/bit | −127 to +127 years |

Example:

140 254 179 4 30 FC 00 00
 Checksum

The Example shows the ICU sending a negative change of one day to the data logging unit date buffers.

As set forth in the above message specifications, the ICU sends the change in time and/or data to the data logging unit by specifying its MID (266). The data logging unit receives the message or messages from the ICU (268, FIG. 7B), and in response, updates values in a buffer for storing the difference (delta) between vehicle standard time and driver local time (270). In this particular implementation, the battery backed RAM in the data logging unit includes this memory buffer. The data logging unit adds a signed change in time to the cumulative time "delta" or "offset" stored in the buffer. Similarly for a change in date, it adds a signed change in date to the cumulative date value stored in the buffer.

As an alternative to communicating changes in local time over the data link, the keypad of the ICU can be directly connected to the data logging unit to transfer data representing changes in local time. In response, the data logging unit would then update the time/date buffer as described above.

After updating the buffer, the data logging unit sends a message, transferring the updated time or date to the ICU (272). In this particular implementation, the data logging unit issues a message using the J1587 standard parameters, PID 251 in the case of an update in time, or PID 252 in the case of an update of the date.

The specification for PIDs 251 and 252 used in this embodiment are set forth below.

| PID 251 - Clock | |
|---|---|
| Parameter Data Length: | 3 Characters |
| Data Type: | Each Character - Unsigned Short Integer |
| Resolution: | Character 1 = 0.25 s/bit |
| | Character 2 = 1 min/bit |
| | Character 3 = 1 h/bit |
| Maximum Range: | Character 1 = 0 to 63.75 s |
| | Character 2 = 0 to 255 min |
| | Character 3 = 1 h/bit |
| Transmission Update Period: | On request |
| Message Priority: | 8 |
| Format: | PID   Data |

| | | |
|---|---|---|
| 251 | | nabc |
| n | - | Number of parameter data characters = 3 |
| a | - | Seconds (not displayed in this implementation) |
| b | - | Minutes |
| c | - | Hours |

| PID 252 - Date | |
|---|---|
| Parameter Data Length: | 3 Characters |
| Data Type: | Each Character - Unsigned Short Integer |
| Resolution: | Character 1 = 0.25 day/bit |
| | Character 2 = 1 month/bit |
| | Character 3 = 1 year/bit |

| | |
|---|---|
| Maximum Range: | Character 1 = 0 to 63.75 day |
| | Character 2 = 0 to 255 month |
| | Character 3 = 0 to 255 year |
| Valid Range: | Character 1 = 0.25 to 31.75 day |
| | Character 2 = 1 to 12 month |
| | Character 3 = 0 to 255 year |
| Transmission Update Period: | On request |
| Message Priority: 8 | |
| Format: PID | Data |
| 252 | nabc |
| n - | Number of parameter data characters = 3 |
| a - | Day |
| b - | Month |
| c - | (Year - 1985) |

A value of 0 for the date (Character 1) is null. The values 1, 2, 3 and 4 are used to identify the first day of the month; 5, 6, 7, and 8 identify the second day of the month etc.
A value of 0 for the month (Character 2) is null. The value 1 identifies January; 2 identifies February, etc.
A value of 0 for the year (Character 3) identifies the year 1985, a value of 1 identifies 1986, etc.

In response to the broadcast of the time or date update, the ICU retrieves and displays the current time and date (274). Although possible, preferably in this particular implementation the ICU does not maintain a separate clock for driver local time. Instead, it requests time as necessary from the data logging unit. However, it is also possible to maintain driver local time in the ICU. In an alternative implementation, the ICU could maintain the delta between local and vehicle standard time, and use the local delta value to compute driver local time.

Figure 8A:
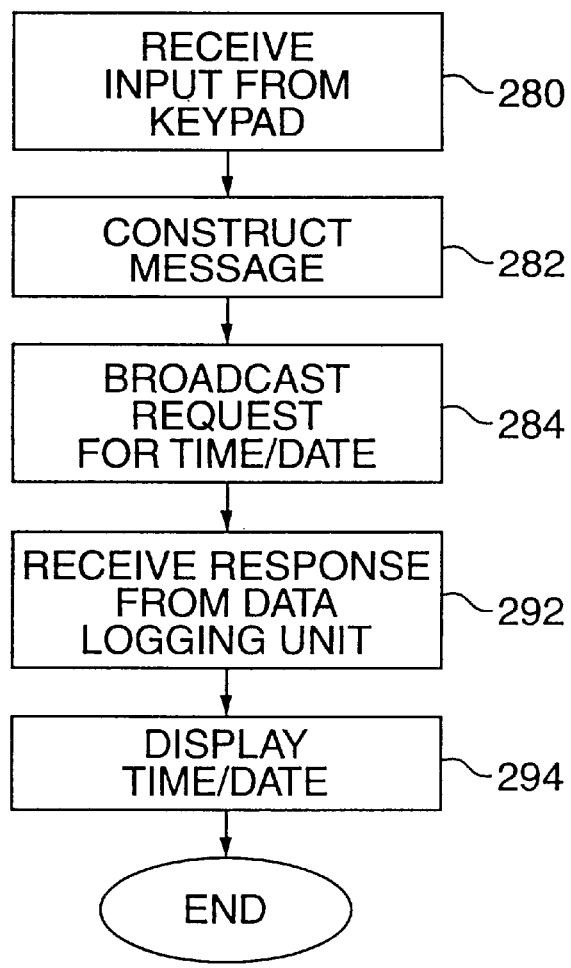
FIGS. 8A and 8B are flow diagrams illustrating the process for displaying local time in one embodiment.
Figure 8B:
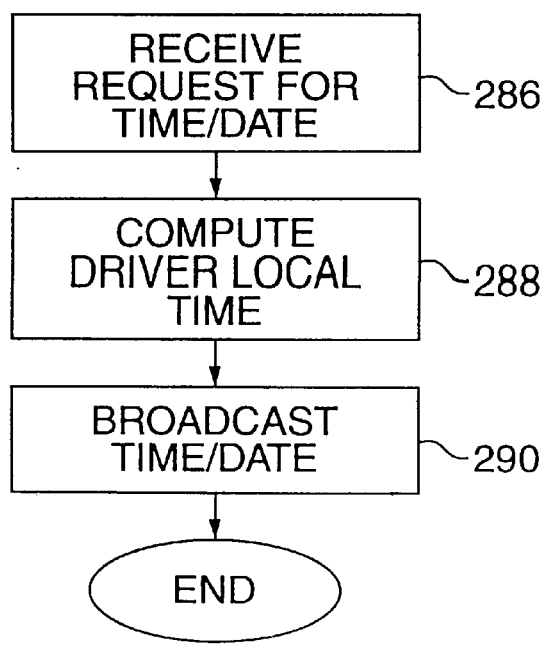

FIGS. 8A and 8B are flow diagrams illustrating the process for displaying local time in one embodiment. FIG. 8A illustrates the steps executed by the ICU to request time from the data logging unit, and FIG. 8B illustrates the steps executing by the data logging unit in response to this request for time.

As shown in FIG. 8A, the process begins when a user presses the time key on the keypad to request local time (280). In response to this input, the ICU constructs a message requesting the time and date (282). The message specifically includes the MID of the ICU, followed by PID 128 and the MID of the data logging unit, which represents a request for parameter transmission from the data logging unit. The message further includes PID 251 and 252 representing a request for the time and date, respectively.

The specification for PID 128 is forth in SAE J1587 and are provided below.

| | |
|---|---|
| PID 128 - Component Specific Parameter Request--Used to request parameter data transmissions from a specified component on the data link. | |
| Parameter Data Length: | 2 Characters |
| Data Type: | Unsigned Short Integer (both characters) |
| Resolution: | Binary (both characters) |
| Maximum Range: | 0 to 255 (both characters) |
| Transmission Update Period: | As needed |
| Message Priority: 8 | |
| Format: PID | Data |
| 128 | ab |
| a - | Parameter number of the requested parameter |
| b - | MID of the component from which the parameter data is requested |

The ICU then broadcasts this message on the data link (284). As shown in FIG. 8B, the data logging unit receives this message and begins to prepare a response (286). In this implementation, the data logging unit computes driver local time by adding the cumulative offset stored in the buffer to the vehicle standard time provided by the real time clock (288). Similarly, it computes the date to be displayed with driver local time by adding the cumulative offset for the date to the date provided by the real time clock (288).

After computing driver local time, the data logging unit constructs time and date messages and broadcasts them on the data link (290). The format of these messages adheres to the J1587 standard for PIDs 251 and 252 as set forth above.

Returning again to FIG. 8A, the ICU is programmed to receive the time and data messages (292). It then reads the value for time and date provided in these messages and displays the time and date on the display device (294).

The approach described above enables the data processing system on the truck to monitor and record system-wide events and faults with respect to vehicle standard time, and to display correct driver local time.

While I have described the invention with reference to several specific embodiments, I do not intend to limit the scope of my invention to these specific embodiments. The master clock can be implemented in a variety of ways. It need not be incorporated into a data logging unit, but instead, could act as a stand alone device or could be incorporated into another ECU. The data logging device can be implemented in a variety of ways as well. It could be designed to monitor vehicle performance data through discrete sensors or through ECUs coupled to a shared data link, for example. The local time display and input control can be implemented in a variety of ways as well. For instance, they can implemented in an integrated dash control device such as the instrument control unit, or in discrete devices.

Having described and illustrated the principles of my invention with reference to a preferred embodiment and several variations thereon, it should be apparent that the invention can be modified in arrangement and detail without departing from its principles. Accordingly, I claim all modifications as may come within the scope and spirit of the following claims.

I claim:

1. A master vehicle clock in a truck comprising:

a real time clock operable to maintain vehicle standard time for vehicle performance data measured from at least two vehicle data measuring devices in the truck;

a data logging device in communication with the vehicle data measuring devices and the real time clock; the data logging device being operable to buffer vehicle performance parameters from the vehicle data measuring devices and the data logging device being operable to write a set of the buffered vehicle performance parameters along with a vehicle standard time indicator to a file in response to a user input event, where the set of buffered vehicle performance parameters is defined by a moving period of time that includes a time of the user input event;

memory communicative with the real time clock, the memory operable to maintain a difference between the vehicle standard time and a driver local time;

local time display device communicative with the real time clock, the local display device being operable to display the local driver time in a cabin of the truck; and an input control communicative with the real time clock, the input control being operable to receive input from a user representing a change in the driver local time, and operable to communicate the change to the real time clock.

2. A data recording system on a vehicle, the system comprising:

a plurality of vehicle data measuring devices operable to measure vehicle performance data;

a master vehicle clock operable to maintain vehicle standard time for the vehicle, and operable to maintain driver local time;

a data logging device communicative with the plurality of the vehicle data measuring devices and the master vehicle clock, the data logging unit being operable to monitor the vehicle performance data and to record selected vehicle performance data along with a time stamp in vehicle standard time from the master vehicle clock;

a local time display communicative with the master vehicle clock, the local time display being operable to display the driver local time.

3. In a vehicle including a data logging device for monitoring and recording events, a method for recording vehicle data relative to vehicle standard time and for maintaining driver local time, the method comprising:

recording vehicle performance data relative to vehicle standard time by stamping slices of the vehicle performance data with the vehicle standard time from a master vehicle clock;

storing a delta value representing a difference between the vehicle standard time and a driver local time;

computing the driver local time from the delta value and the vehicle standard time;

monitoring for a manually triggered event entered into an input device in the vehicle;

in response to detecting the manually triggered event, storing the slices of vehicle performance data and time stamp in vehicle standard time over a predefined period that includes a time of occurrence of the manually triggered event.

* * * * *